United States Patent
Ertoz et al.

(10) Patent No.: US 7,668,843 B2
(45) Date of Patent: Feb. 23, 2010

(54) IDENTIFICATION OF ANOMALOUS DATA RECORDS

(75) Inventors: Levent Ertoz, Mountain View, CA (US); Vipin Kumar, Plymouth, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 228 days.

(21) Appl. No.: 11/302,989

(22) Filed: Dec. 14, 2005

(65) Prior Publication Data

US 2006/0161592 A1    Jul. 20, 2006

(51) Int. Cl.
G06F 7/00 (2006.01)
G06F 17/30 (2006.01)
G06F 17/00 (2006.01)

(52) U.S. Cl. .............................. 707/100; 707/1; 706/59
(58) Field of Classification Search ........................ None
See application file for complete search history.

(56) References Cited

U.S. PATENT DOCUMENTS

| | | | |
|---|---|---|---|
| 7,206,674 B1 * | 4/2007 | Statler et al. ................... 701/14 |
| 2006/0047617 A1 * | 3/2006 | Bacioiu et al. ................. 706/59 |
| 2006/0064438 A1 * | 3/2006 | Aggarwal ...................... 707/200 |
| 2006/0251325 A1 * | 11/2006 | Florin et al. ................... 382/173 |

OTHER PUBLICATIONS

Aggarwal, C. C., et al., "Outlier Detection for High Dimensional Data", *Proceedings of the 2001 ACM SIGMOD International Conference on Management of Data*, (2001), 37-46.

Angiulli, F., et al., "Fast Outlier Detection in High Dimensional Spaces", *Proceedings of the 6th European Conference on Principles of Data Mining and Knowledge Discovery (PKDD 2002)*, (2002), 15-26.

Arning, A., et al., "A Linear Method for Deviation Detection in Large Databases", *Knowledge Discovery and Data Mining*, (1996), 164-169.

Arshad, M. H., et al., "Identifying Outliers via Clustering for Anomaly Detection", *Technical Report CS-2003-19*, Department of Computer Sciences, Florida Institute of Technology, Melbourne, FL, Retrieved from the Internet: <https://www.cs.fit.edu/Projectsitech_reports/cs-2003-19.pdf>, (2003), 1-8.

Barbará, D., et al, "Bootstrapping a Data Mining Intrusion Detection System", *Proceedings of the ACM Symposium on Applied Computing (SAC 2003)*, (2003), 421-425.

Barbará, D., et al., "COOLCAT: An Entropy-Based Algorithm for Categorical Clustering", *Proceedings of the 11th International Conference on Information and Knowledge Management (CIKM '02)*, (2002), 582-589.

(Continued)

*Primary Examiner*—Apu M Mofiz
*Assistant Examiner*—Susan Y Chen
(74) *Attorney, Agent, or Firm*—Schwegman, Lundberg & Woessner, P.A.

(57) ABSTRACT

Identifying anomalies or outliers in a set of data records employs a distance or similarity measure between features of record pairs that depends upon the frequencies of the feature values in the set. Feature distances may be combined for a total distance between record pairs. An outlier is indicated for a certain score that may be based upon the pairwise distances. Outliers may be employed to detect intrusions in computer networks.

21 Claims, 2 Drawing Sheets

OTHER PUBLICATIONS

Barbará, D., et al., "Detecting Novel Network Intrusions Using Bayes Estimators", *Proceedings of the SIAM International Conference on Data Mining (SIAM 2001)*, 2001, 1-17.

Bay, S. D., et al., "Mining Distance-Based Outliers in Near Linear Time With Randomization and a Simple Pruning Rule", *Proceedings of the Ninth ACM SIGKDD International Conference on Knowledge Discovery and Data Mining (SIGKDD '03)*, (2003), 29-38.

Breunig, M. M., et al., "LOF: Identifying Density-Based Local Outliers", *Proceedings of the ACM SIGMOD International Conference on Management of Data (MOD 2000)*, (2000),93-104.

Breunig, M. M., et al., "OPTICS-OF: Identifying Local Outliers", *Proceedings of The Third European Conference on Principles of Data Mining and Knowledge Discovery (PKDD '99)*, (1999), 262-270.

Chan, P. K., et al., "A Machine Learning Approach to Anomaly Detection", *Technical Report CS-2003-06*, Department of Computer Sciences, Florida Institute of Technology, Melbourne, FL, (Mar. 29, 2003), 13 pgs.

Eskin, E., et al., "A Geometric Framework for Unsupervised Anomaly Detection: Intrusions in Unlabeled Data", *Applications of Data Mining in Computer Security*, (2002), 20 pgs.

Ghosh, A. K., "Learning Program Behavior Profiles for Intrustion Detection", *Proceedings of the 1st USENIX Workshop on Intrusion Detection and Network Monitoring*, (Santa Clara, CA, Apr. 9-12, 1999), (1999), 51-62.

Goodall, D. W., "A New Similarity Index Based on Probability", *Biometrics*, (Dec. 1966), 882-907.

Hawkins, S., et al., "Outlier Detection Using Replicator Neural Networks", *Proceedings of the 4th International Conference on Data Warehousing and Knowledge Discovery*, (2002), 170-180.

Jin, W., et al., "Mining Top-n Local Outliers in Large Databases", *Proceedings of The 7th ACM SIGKDD International Conference on Knowledge Discovery and Data Mining (KDD '01)*, (2001), 293-298.

Knorr, E. M., et al., "Algorithms for Mining Distance-Based Outliers in Large Datasets", *Proceedings, 24th International Conference Very Large Data Bases (VLDB 1998)*, (1998), 392-403.

Knorr, E. M., et al., "Distance-Based Outliers: Algorithms and Applications", *The VLDB Journal*, 8(3-4), (2000), 237-253.

Knorr, E. M., et al., "Finding Intensional Knowledge of Distance-Based Outliers", *Proceedings of the 25th International Conference of Very Large Databases (VLDB 1999)*, (1999), 211-222.

Kruegel, C., et al., "Bayesian Event Classification for Intrusion Detection", *Proceedings of the 19th Annual Computer Security Applications Conference (ACSAC 2003)*, (2003), 10 pgs.

Marchette, D., "A Statistical Method for Profiling Network Traffic", *Proceedings of the Workshop on Intrusion Detection and Networking Monitoring*, (1999), 119-128.

McCallum, A., et al., "Efficient Clustering of High-Dimensional Data Sets With Application to Reference Matching", *Proceedings of the Sixth ACM SIGKDD International Conference on Knowledge Discovery and Data Mining (KDD 2000)*, (2000), 169-178.

Mukkamala, S., et al., "Intrusion Detection Systems Using Adaptive Regression Splines", *Proceedings of the 6th International Conference on Enterprise Systems (ICEIS '04)*, vol. 3, (2004), 26-33.

Portnoy, L., et al., "Intrusion Detection With Unlabeled Data Using Clustering", *Proceedings of ACM CSS Workshop on Data Mining Applied to Security (DMSA 2001)*, (2001), 14 pgs.

Ramaswamy, S., et al., "Efficient Algorithms for Mining Outliers From Large Data Sets", *Proceedings of the ACM SIGMOD International Conference on Management of Data (SIGMOD 2000)*, (Dallas, TX),(2000), 427-438.

Ryan, J., et al., "Intrusion Detection With Neural Networks", *Proceedings of the Conference on Advances in Neural Information Processing Systems*, 10, (1997), 943-949.

Saltenis, V., "Outlier Detection Based on the Distribution of Distances Between Data Points", *Informatica*, 15(3), (Abstract Only). [online]. Retrieved from the Internet: <http://vtex.lt/informatica/htm/INFO558.htm>, (2004), 1 pg.

Schölkopf, B., et al., "Estimating the Support of a High-Dimensional Distribution", *Technical Report MSR-TR-99-87*, Microsoft Research, Microsoft Corporation, (Redmond, WA 98052), (Nov. 27, 1999), 1-27.

Sebyala, A. A., et al., "Active Platform Security Through Intrusion Detection Using Naive Bayesian Network for Anomaly Detection", *Proceedings of the London Communications Symposium 2002*, (2002), 4 pgs.

Smith, R., "Clustering Approaches for Anomaly Based Intrusion Detection", *Proceedings of Walter Lincoln Hawkins '32, Graduate Research Conference*, (2002), 421-425.

Sykacek, P., "Equivalent Error Bars for Neural Network Classifiers Trained By Bayesian Inference", *Proceedings of the European Symposium on Artificial Neural Networks (Bruges)*, (1997), 7 pgs.

Tang, J., et al., "Enhancing Effectiveness of Outlier Detections for Low Density Patterns", *Proceedings of the 6th Pacific-Asia Conference on Advances in Knowledge Discovery and Data Mining (PAKDD 2002)*, (2002), 535-548.

Valdes, A., et al., "Adaptive, Model-Based Monitoring for Cyber Attack Detection", Lecture Notices in Computer Science, vol. 1907/2000, *Proceedings Of the Third International Workshop on Recent Advances in Intrusion Detection (RAID 2000)*, (2000), 80-92.

Vinueza, A., et al., "Unsupervised Outlier Detection and Semi-Supervised Learning", *Technical Report CU-CS-976-04*, University of Colorado at Boulder, CO, Retrieved from the Internet: <http://www.cs.colorado.edu/~grudic/publications/CU-CS-976-04.pdf>, (May 2004), 7 pgs.

\* cited by examiner

IDENTIFICATION OF ANOMALOUS DATA RECORDS

TECHNICAL FIELD

The subject matter relates to electronic data processing, and more specifically concerns comparing data records in a set to determine which of them differ in a significant way from the others.

BACKGROUND

Data mining and similar endeavors must analyze massive data sets generated by electronic information handling systems. One of the objectives of such endeavors may be to sift a high volume of existing data records or a stream of incoming records to flag those records that differ in some significant manner from the rest—that is, to identify any records that are anomalous when compared to other records in the dataset. These may also be called outliers. Data records may have a number of other names in various contexts, such as entries, files, messages, or packets.

Identifying anomalous records may be useful in a number of situations. An outlier in a communications network may indicate an attempted intrusion of the network. Credit-card purchases of expensive items in a short time period may indicate theft of the card. Unusual financial transactions may indicate money laundering. Sudden excessive temperatures in a building may suggest failure of the building's heating system. Consistently increasing size measurements of a manufactured product may point to cutting-tool wear. Anomalies are not necessarily harmful. A sudden increase in newspaper sales or Web-site accesses may indicate a breaking story.

Detecting anomalies differs from detecting clusters; these are not in general merely complementary tasks. The goal of cluster detection is to find sets of records that are similar to each other and not as similar to the rest of the records. Clusters of records are crisp when the similarity of close neighbors is much higher than their similarity to other records. Clusters are ill-defined when many pairwise similarities are high, and there is little distinction between nearest neighbors and other records. On the other hand, the goal of anomaly detection is to identify outlier records that are far away from other records in a dataset, whether or not those records display clusters. Well-defined anomalies show a clear distinction between how distant they lie from other records and how distant the other records are from each other. Anomalies are less well-defined when most of the pairwise distances lie in the same range, and the highest distance is not much larger than that range.

The simplest kind of anomaly is a deviation from a constant value of a single established norm, as in the case of cutting-tool wear. Their detection does not generally require complex algorithms or sophisticated measures. Problems increase when the norm is multi-modal, or when some of the modes are not previously known. In some scenarios, the modes may be time dependent; increasing traffic is not unexpected during a rush hour, yet it may be anomalous at other times.

Detection of anomalies also becomes harder when the data records have multiple features. Some anomalies may not exhibit out-of-the-ordinary behavior in any individual feature. For example, a height of 5 feet 7 inches and a weight of 80 pounds are not unusual separately, but they are anomalous when occurring together in the same person. Also, different feature may not be normalizable to the same scale; is a 5-year age difference comparable to a difference of $20,000 in annual income or not? Further, features might not even have numerical values; automobiles may come in categories such as red, blue, black, and green.

Models have been employed to detect anomalies or outliers in datasets. This approach, however, requires an explicit supervised training phase, and may require training sets free of outliers. Neural networks of several known types are available for this purpose. Regression models, possibly including basis functions, have been employed. Probabilistic models, perhaps including conditional probabilities, generally require a training set free of outliers. Bayesian networks may aggregate information from different variables to model causal dependencies among different properties of an event or record, may also incorporate external knowledge, or may create anomaly patterns along with normal patterns of properties. Pseudo-Bayes estimators may reduce false-alarm rates. Support-vector machines are learning machines capable of binary classification by hyperplanes, and may function in an unsupervised setting.

Clustering-based detection techniques find anomalies as a byproduct of the clustering algorithm. Although they need not be supervised and may operate in an incremental mode, such techniques are not optimized for finding outliers, they assume that the normal data points are exceedingly more numerous than the anomalous ones. In addition, they are computationally intensive, requiring pairwise distances between all data points.

Distance-based schemes employ some type of defined distance to measure similarity among data records. Schemes that measure pairwise distances are computationally intensive. Some perform poorly if the data has regions of differing density. When the data has a large number of features, the distribution is necessarily sparse in higher-dimensional space, so that the meaningfulness of distance becomes lost.

SUMMARY

The invention offers methods and apparatus for reliably identifying anomalous data-set records in a timely fashion without excessive computational effort. Individual records in the data set may assume a variety of forms for a variety of purposes, such as messages in a communications stream, database entries, financial transactions (e.g., withdrawals from automated teller machines, ATMs for theft detection), heat-sensor data collected in a data center (indicating possible machine failure), or ocean-temperature data (for hurricane prediction). Each record may have one or more features. The features may have numeric or non-numeric values. Although some optional aspects may benefit from a training set, in general no training set is required.

A distance measure between pairs of values of the same feature in different records produces small distances for feature mismatches when both values represent rare values in the data set, and produces large values for mismatches where both values have frequent values in the data set. (The terms "small" and "large" may be interchanged; that is, high similarity may be associated with either a small or a large distance, and low similarity with the other.) An anomaly score for each record combines distances between that record and at least some of the other records for the feature. A record is selected as anomalous when the distance satisfies a predetermined criterion.

Where records have multiple features, one or more of them may optionally be selected for measuring distances. Where multiple features are selected, their distances may be calculated and marked as anomalous separately. One feature is then selected from a subset of the features that meet a predetermined criterion with respect to the anomalous records for each individual feature. The selected feature is used to identify anomalous records.

Optionally, less than all of the records in the data set may be sampled, and distances calculated only for the sampled records.

DRAWING

DESCRIPTION

Figure 1:
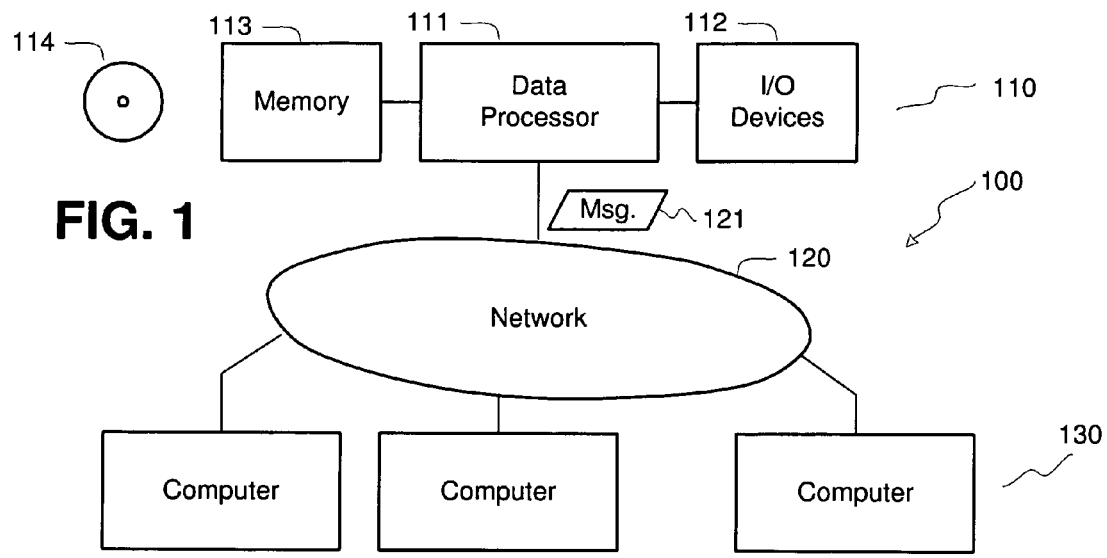
FIG. 1 is a high-level block diagram showing an example of a system in which the invention may find utility.

FIG. 1 illustrates one example of a context 100 in which the invention may employed. An electronic processing system 110 incorporates a data processor 111, input/output devices 112 such as keyboards, printers, and displays, and one or more memories 113 for storing instructions and data. One of the memories may accept a medium 114 containing instructions executable in processor 111 for carrying out the invention. System 110 is coupled to a network 120. The network may comprise a LAN, a WAN such as the internet, or any other facility for communicating messages such as 121. The network couples to further computers 130, which may communicate messages to system 110.

Figure 2:
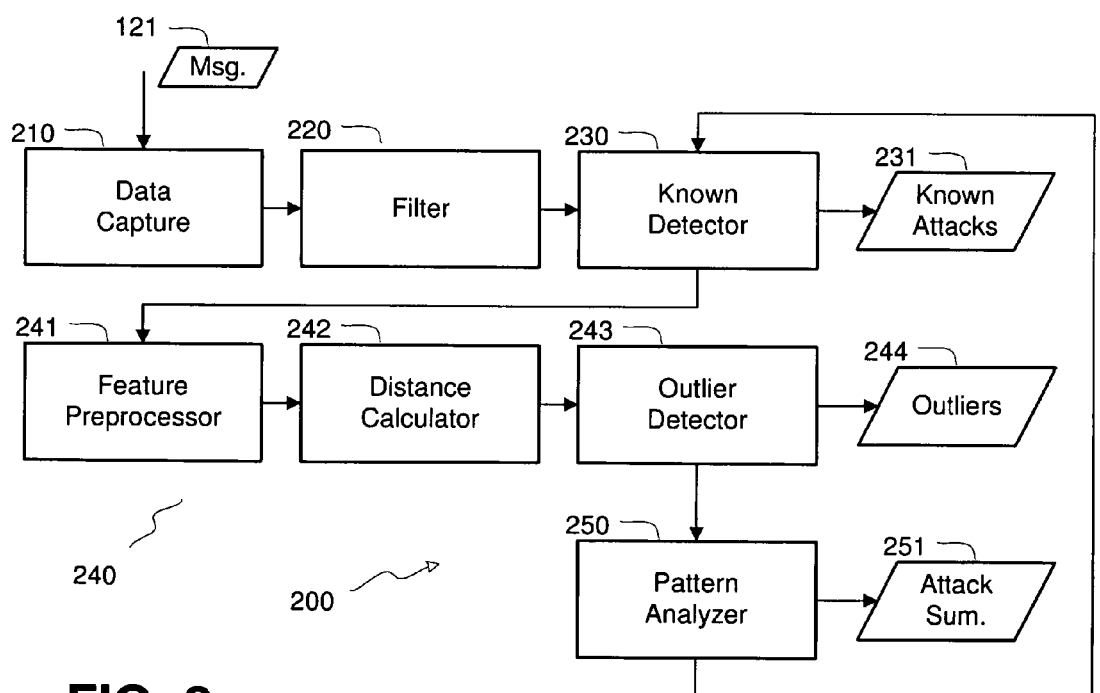
FIG. 2 is a block diagram of a a representative intrusion detection system incorporating an anomaly detector.

FIG. 2 shows an example of apparatus 200 which may reside in or be coupled to data processing system 110 so as to receive records such as messages 121 from network 120. (Because "record" is a more general term that would be normally used in other contexts, messages will be referred to as "records" herein.) Any of the blocks may be performed by software, hardware, or any combination.

Block 210 represents a hardware or software receiver that captures records 121 from an incoming stream or a storage for analysis. In one embodiment, the records are taken from routers attached to network 120. In many cases, certain records are known to be acceptable, and need not be processed further. Filter 220 may remove records from specified network sources, for example. Optional detector 230 detects attacks for which the models are known, with techniques employed by anti-virus software. Detector 230 may then display these records at 231 and may remove them from the stream. Filters and detectors may increase the productivity of human and computer analysts by removing records that are known to have less importance or danger; the analyst may then focus upon anomalies that are not as obvious.

Preprocessor 241 of anomaly detector 240 selects predetermined features from the records. Some of these are taken directly from each record, such as source or destination internet protocol (IP) addresses, source or destination ports, or protocols. Other features may be derived from one or more records, such as the number of records to a unique IP address within the system from the same source within a certain time interval, or the number of connections to the same destination port during a certain number of previous connections. (Other contexts may employ other types of features and numeric values. For example, financial transactions may investigate bank routing information, monetary amounts, timestamps, etc.) Preprocessor 241 may also attach numerical values to non-numeric or categorical features. In some cases, distance calculations need only know whether the values for categorical features are the same or different; therefore, the actual values employed need not be significant.

Distance calculator 242 determines a pairwise distance measure between a record and other records in a data set of the records. Unit 242 may calculate the distance from every record to every other record. Alternatively, unit 242 may sample some records from the full set, and calculate distances from each current record only to records in the sample. When the records have only a single feature, distances between records represent distances between their single features. Where the records have multiple features, one feature may be selected, or some or all of the features or their distances may be combined into a single measure representing the distance between a pair of records.

Outlier detector 243 combines the distances for each record into a score for that record. When a record score has a certain characteristic, block 243 identifies the record as anomalous, and sends it to a display 244. Detector 243 may identify a record as anomalous (i.e., as an outlier) by comparing its score to a fixed threshold value. Records may further be categorized in multiple grades, such as "anomalous" and "highly anomalous." Criteria other than thresholds may also serve.

Anomalous records 244 may be inspected by a human or computer-based unit (not shown) to determine whether they represent true intrusion attempts or false alarms, and may be removed or sent on as appropriate.

Outliers, or some of them, may also travel to a pattern analyzer 250. For example, module 250 may examine highly anomalous records using association pattern analysis using an "a priori" algorithm to characterize the detected anomalies. These algorithms, however, are employed differently herein. They are normally used to enumerate all possible patterns, and then to select the most interesting ones individually. In the present context, analyzer uses the detected patterns to summarize a group of records, and the selection of one pattern depends upon previous selections by analyzer 250. One of the ways to summarize records for this purpose is to designate a subset of the features as wild cards. For example, if all or most anomalous records have the same IP origination address and a particular subject line but differ in other features, only these two features appear in the summary, and the others are don't-cares. Unit 250 may then develop new signatures and models for attacks. These may be fed to detector 230 for more timely interception of emerging attacks. Analyzer 250 may also prepare a summary 251 of detected attacks or intrusions.

Figure 3:
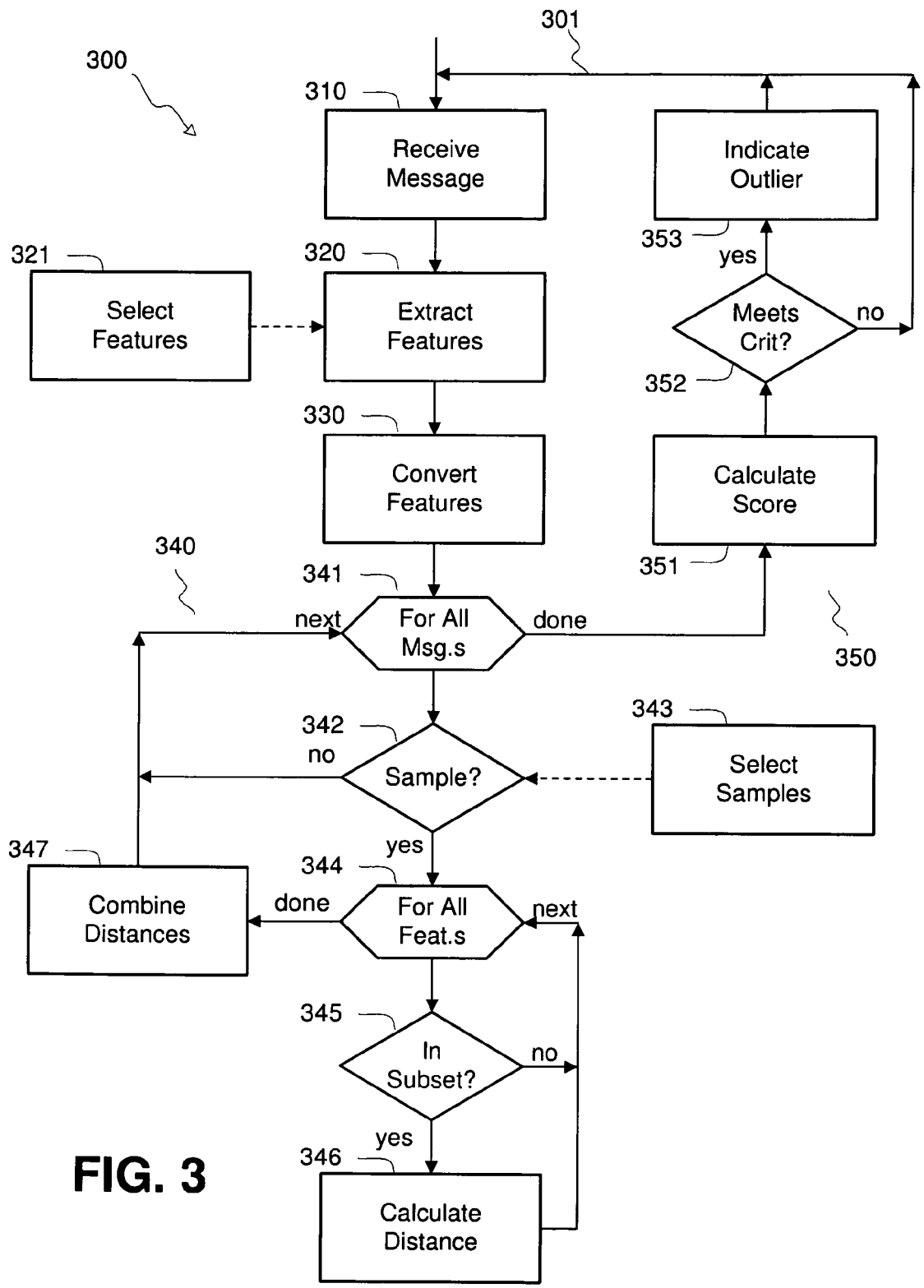
FIG. 3 is a flowchart illustrating an example of a method for detecting anomalies.

FIG. 3 shows an example of a method for identifying an anomalous record or other record in a dataset. Anomaly detector 240, FIG. 2, may implement the method. The method loops at line 301 for each record. The method may execute off-line for all records in a data set, or on-line, for new records as they arrive.

Block 310 receives a subject record in a dataset of records. The subject record may arrive sequentially from a source, may be selectively retrieved from a memory, or accessed in any other manner.

Block 320 extracts one or more features from the record. Features may be derived directly from the subject record, such as an IP address. Features may also be derived at least in part from information regarding other records in the dataset, such as a number of incoming records in a given time period.

Block 321 defines or selects which features are to be extracted, if there are more than one. This operation may be performed once for the entire dataset, periodically, or dynamically as each record is received; or, features may be selected based upon records in previous datasets. Different features may carry different amounts of information with regard to anomaly detection, and are selected for each particular application. If all information-bearing features are removed from a data set, a histogram of pairwise distances would be flat, like white noise. On the other hand, if all features are information-rich, a histogram might reveal multiple humps representing multiple modes in the data. How much each relevant information a specific feature imparts may be determined by evaluating differences between a histogram with all features present, and a histogram with all features except the one specified feature. Another technique is to calculate an entropy function for the two distributions. In some cases, block 321 may select features based upon known (e.g., previously identified) anomalies, either from a human expert or from another method, such as detector 230 in FIG. 2. Block 321 may then make this set of identified outliers most anomalous with respect to a particular anomaly-detection algorithm. A large number of features may render optimizing the selection of an optimum subset of features for this goal. However, a greedy strategy may eliminate one feature at a time, in the same manner that decision trees select one splitting attribute at a time. An example strategy is to eliminate that feature which yields the maximum increase in anomaly scores of the points in concern for each round, for the particular anomaly-detection algorithm. Feature elimination may terminate when eliminating a further features fails to change the anomaly scores significantly. In the case of local anomalies—records that are anomalous with respect to their immediate neighbors, rather than to the entire dataset—a greedy strategy may eliminate that feature which maximizes an increase in average distance to nearest neighbors—or to all other records. Again, feature elimination may stop when the anomaly scores for the identified outliers have been maximized or increased sufficiently. Successively eliminating features from a full set of features differs significantly from adding features one-by-one to a null set. The latter is susceptible to selecting an improper feature when the combination of previously selected features yields a good result, but none of the individual features appear promising.

Block 330 may convert the selected feature(s) to values amenable to measuring distances between pairs of them. Some features, such as IP addresses, already have a numeric form, although even these may be hashed or otherwise modified for ease of computation. Unique values may be attached to categorical features. For example, different network protocols such as {TCP, UDP, ICMP} may be represented by arbitrary values {1, 2, 3} or {A, B, C}. These values need have no computational significance, other than that the values attached to different protocols must be distinct from each other, so that different protocols will have a positive distance between the protocol feature of different records, and will contribute to the frequencies of each value.

Blocks 340 calculate distances of the subject records from other records in the dataset. Block 242, FIG. 2, may implement their operations.

Control block 341 examines records other than the subject record in the dataset, successively, in parallel, or in any other manner.

Optional block 342 asks whether a record is to be sampled, and returns control to block 341 if not. In some applications, a great deal of computation may be avoided with a small loss in accuracy by not calculating pairwise distances from the subject record to every record in the dataset. Block 343, which may execute previously to method 300 or dynamically during the method, selects certain of the dataset records as samples. The number of samples may be chosen as large enough to reveal the smaller modes of behavior, since a record that does not fit any mode in the sample may be identified as anomalous. The number of samples should also be chosen small enough to provide a significant gain in computation speed, if sampling is employed at all. Where method 300 executes on-line, some or all newly arriving records that are not found to be anomalous may be added to the sample set dynamically. If enough historical data is available as a training set, different sample sets may be investigated to determine whether or not they yield similar orderings of anomalies. A training set may contain local anomalies, where an anomaly score reflects the ratio of the average of a record's neighbors' densities to the record's density, Block 343 may then sort the training-set records from highest to lowest density, and calculate distances in that order. Calculation may terminate when an anomaly score of a current record falls below a fixed or variable threshold.

If the records have multiple features, control block 344 accesses each feature. Here again features may be accessed in any order or in parallel. When the current feature is not a member of the subset selected in block 321, block 345 skips the feature.

Block 346 calculates a distance measure $d(v_i, v_j)$ from the value $v_i$ of the current feature of the current record to the value $v_j$ of the corresponding feature of the subject record. Conventional distance measures for similarities perform less well for identifying anomalies. Therefore, the distance measure employed herein emphasizes outliers by making the distance measure large for mismatches when one or both of the feature values are rare in the dataset. Conversely, the distance is small for mismatches when both values are common. If a record feature value does not match then the distance is small to records that have a common value for the feature. Since common-to-common mismatches contribute little to distance, dominant modes of behavior are not widely separated. Large clusters are closer, and outliers are far away from other points.

A suitable distance measure for anomaly detection is given by the definition $$d(v_i, v_j) = \log \frac{N}{Frea(v_i)} * \log \frac{N}{Freq(v_j)}$$

where N is a number of records in the dataset, the total number or some subset thereof. The distance may be defined as d=0 when $v_i=v_j$. (Distances may be made small instead of large and large instead of small, if desired, by inverting the fractions in the equation.) This definition makes $d(v_i,v_j)=d(v_j,v_i)$; although this is a common characteristic of distances, it is not a necessary condition for this purpose. Other distance definitions are possible. For example, distances could be made data-dependent by calculating distance with actual data values, rather than considering only whether or not the feature values match. Another example might calculate distance d(a, b) from a first record to a second record based upon a density of the second record. Density may be defined in a number of ways; a convenient measure may comprise the average of the distances of a record from its ten closest neighbors. In the latter case, d(a,b)≠d(b,a), in general.

This approach to distance differs from the usual distance measure, which assigns a predetermined distance between all pairs of feature values, as in the following generalized distance matrix of network protocols.

|       | T(CP)    | U(DP)    | I(CMP)   |
|-------|----------|----------|----------|
| T(CP) | 0        | $d_{TU}$ | $d_{TI}$ |
| U(DP) | $d_{UT}$ | 0        | $d_{UI}$ |
| I(CMP)| $d_{IT}$ | $d_{IU}$ | 0        |

Rather than assigning heuristically determined values to each entry, the present distance measure calculates them as functions of the frequencies of the various feature values. For example, if a dataset includes 60 records, 10 records having a TCP protocol, 20 having UDP and 30 having ICMP, then $d_{TU}$=F(10,20)=log(60/10)*log(60/20), $d_{TI}$=F(10,30)=log(60/10)*log(60/30), etc.

Block 346 calculates a separate distance measure $d_k$ for each feature k=1, ..., n of the n selected features. Block 347 combines these into an overall distance D=F($d_1$, ..., $d_n$). This embodiment employs a simple summation, D=$\Sigma_k d_k$. Other types of distance formulations may be employed, a more general formulation being $$D = \left( \sum_{k=1}^{n} w_k d_k^r \right)^{1/q}.$$

Common special cases include Manhattan or taxicab distance, where r=q=1; Euclidean distance, where r=q=2; Chebyshev distance, where r=q=∞, and sum of squares, where r=2, q=1. Coefficients $w_k$ may weight the contribution of each feature to the total distance. Distance calculation may also include one or more normalizing components using techniques such as z-transform or [0-1]. That is, the total distance used in an embodiment is an unweighted Manhattan distance of the individual feature distances.

When the total distances from the subject record to other dataset records have been calculated, blocks 350 determine whether or not the subject record is an outlier—that is, whether it is anomalous in relation to the other dataset records. Detector 243, FIG. 2, may implement blocks 350.

Block 351 calculates a score for the subject record, which measures how anomalous the current record is. In the simplest case, the score might comprise a minimum distance from other records in the set. More generally, the score may involve multiple or all distances between records in the dataset. A convenient algorithm for calculating a score from the distances between the subject record and other records is a local outlier factor (LOF) proposed by Breunig, Kriegel, Ng, and Sander, "LOF: Identifying Density-Based Local Outliers," ACM SIGMOD (2000).

Operation 352 applies one or more criteria to the score. In an embodiment, a single criterion such as a fixed threshold may serve; the subject record is anomalous if its numeric score exceeds a predetermined value. Alternatively, the threshold may constitute a variable value. For example, a threshold may be set to limit the number of outliers detected per unit of time to a specified quantity.

Block 353 indicates that the subject record is an outlier when it meets the criteria of block 352. Block 353 may pass the record itself to a memory 113 or output device 112, FIG. 1, for further analysis by a human operator or by another device, such as pattern analyzer 250, FIG. 2.

Stepping outside the specific context of detecting intrusions from message records in a network, embodiments of the present invention may detect outliers or anomalous records in a set or a sampled subset of N records in a dataset where each record includes one or more attributes or features, any of which may be categorical (e.g., colors such as red, green, blue, network protocols such as TCP, UDP, ICMP) or numeric (e.g., age, salary, number of bytes). A method may include the operations of:

(a) selecting a set of features from each of the records, and, for each selected feature, (b) if the feature is categorical and may assume k values $v_i$ {1 . . . i . . . k}, calculating a distance or similarity measure $d(v_i,v_j)$ between two records due to this feature that (b.1) is dependent upon the frequency of the feature values $v_i$ { 1 . . . i . . . k} among all the records, (b.2) defines a distance or similarity for all pairs of values $(v_i,v_j)$ 1≦i,j≦k ∈ i≠j. These are non-diagonal values in a k×k distance/similarity matrix. (A trivial distance or similarity measure would use the same value, such as 0 or 1 or infinity, for all non-diagonal matrix elements.)

(b.3) The distance relation $d(v_i,v_j)$ is defined to produce a large distance for mismatches between $v_i$ and $v_j$ where both $v_i$ and $v_j$ are rare values in the records, and to produce a small distance for mismatches where both $v_i$ and $v_j$ are common values, or in a complementary usage, the distance relation $d(v_i,v_j)$ produces a small distance for mismatches between $v_i$ and $v_j$ where both $v_i$ and $v_j$ are rare values in the records, and produces a large distance for mismatches where both $v_i$ and $v_j$ are common values.

(c) If the feature is continuous, a distance or similarity $d(v_i,v_j)$ between two records due to this feature may comprise a function of the difference between the two values (or their functions) and the frequency of the values (and their neighborhoods) among all records. For example, if the value of a feature for a record is x, then the number of records that have values between (x−δ) and (x+δ) may influence the distance between this record and all other records due to this feature.

(d) The method may combine the distances or similarity due to each feature for pairs of records $R_i$ and $R_j$ to compute a distance or a similarity value $D(R_i, R_j)$, and (e) generate an anomaly score for each record $R_i$ given the values of $D(R_i,R_j)$ where 1≦j≦N.

Some embodiments may specify a distance as $$d(v_i, v_j) = \log \frac{N}{Freq(v_i)} * \log \frac{N}{Freq(v_j)}$$

further defining d=0 when $v_i$=$v_j$. Alternatively, distance may be defined as $$d(v_i, v_j) = \log \frac{Freq(v_i)}{N} + \log \frac{Freq(v_j)}{N}.$$

Some embodiments may further determine whether a feature should use a distance/similarity along the lines of (1.b.3) or (1.b.4), or other functions defined using (1.b.2), from the distribution of pairwise distributions of distances and similarity among the records.

Some embodiments may employ a subset of records considered anomalous to select multiple attributes from each record and their desired distance/similarity function, so that the given records become highly anomalous in a selected feature space by detecting attribute-anomalous records in the data set with respect to each of the attributes; then determining a subset of the attributes that meets a predetermined criterion with respect to the attribute-anomalous records.

Embodiments of the invention may assign anomaly scores in an unsupervised manner by sampling the records in the dataset; and calculating the anomaly score for each candidate without considering distances to all of the sampled records.

CONCLUSION

The foregoing description and the drawing describe specific aspects and embodiments of the invention sufficiently to enable those skilled in the art to practice it. Alternative embodiments may incorporate structural, logical, electrical, process, or other changes. Examples merely typify possible variations, and are not limiting. Individual components and functions are optional unless explicitly required, and the sequence of operations may vary. Portions and features of some embodiments may be included in or substituted for those of others. The Abstract is furnished only as a guide for subject-matter searching, and is not to be used for claim interpretation. The scope of the invention encompasses the full ambit of the claims and all available equivalents.

We claim as our invention:

1. A method for execution by one or more digital processors, the method for detecting whether a current record in a dataset of records is an anomalous record, comprising:
defining a feature of the records in the dataset;
calculating, by the one or more digital processors, a plurality of pairwise distances between a value of the feature in the current record and values of the feature in at least some of the records in the dataset, where each pairwise distance is either:
(A) small for mismatches between the values when both of the values rarely occur in the dataset records or where the distance is large for mismatches between the values when both of the values commonly occur in the dataset records; or
(B) large for mismatches between the values when both of the values rarely occur in the dataset records or where the distance is small when both of the values commonly occur in the dataset records; and
in response to the plurality of distances d, producing a score for the current record;
indicating that the current record is anomalous if the score meets a predetermined criterion;
wherein the distances are responsive to the frequency Freq($v_i$) of the value $v_i$ of the feature in the current record and to the frequency Freq($v_j$) of the value $v_j$ of the feature in another of the records in the dataset; and
calculating each of the pairwise distances d from a value $v_i$ of the feature in the current record and a value $v_j$ of the feature in the other of the dataset records according to the relation $$d(v_i, v_j) = \log\frac{N}{Freq(v_i)} * \log\frac{N}{Freq(v_j)}$$

where N represents a number of records in the dataset.

2. The method of claim 1 comprising defining d=0 for $v_i = v_j$.

3. The method of claim 1 further comprising:
defining a plurality of features of the records in the dataset;
for each of the features, calculating one of the pairwise distances between the each feature of the current record and a corresponding feature of another of the dataset records;
combining the distances to produce a total distance between the current record and the other of the dataset records; and
calculating the score for the current record in response to the total distance.

4. The method of claim 3 where at least some of the distances $d_k$ are summed to produce the total distance D.

5. The method of claim 1 where the feature is categorical rather than numeric, comprising attaching a numeric value to different values of the feature.

6. The method of claim 5 where the numeric value is unique for each value of the categorical value.

7. The method of claim 1 further comprising:
selecting a subset of the dataset records as samples;
calculating the pairwise distances from the current record only to the samples.

8. The method of claim 7 where the number of the samples is sufficiently large enough to include small modes of behavior of the dataset.

9. The method of claim 1 where the current record is indicated as anomalous if the score bears a predetermined relationship to a threshold.

10. The method of claim 9 where the threshold is variable.

11. The method of claim 1 further comprising:
defining a neighborhood amount for each of the values; and
determining that a match exists between the values if they differ by less than the neighborhood amount.

12. A storage medium containing instructions executable in a digital processor for carrying out a method comprising:
defining a feature of the records in the dataset;
calculating a plurality of pairwise distances between a value $v_i$ of the feature in the current record and values $v_j$ of the feature in at least some of the records in the dataset, where each pairwise distance d is either:
(A) small for mismatches between $v_i$ and $v_j$ when both $v_i$ and $v_j$ rarely occur in the dataset records or where the distance is large for mismatches between $v_i$ and $v_j$ when both $v_i$ and $v_j$ commonly occur in the dataset records; or
(B) large for mismatches between $v_i$ and $v_j$ when both $v_i$ and $v_j$ rarely occur in the dataset records or where the distance is small when both $v_i$ and $v_j$ commonly occur in the dataset records; and
in response to the plurality of distances d, producing a score for the current record;
indicating that the current record is anomalous if the score meets a predetermined criterion;
wherein the distances are responsive to the frequency Freq($v_i$) of the value $v_i$ of the feature in the current record and to the frequency Freq($v_j$) of the value $v_j$ of the feature in another of the records in the dataset; and
calculating each of the pairwise distances d from a value $v_i$ of the feature in the current record and a value $v_j$ of the feature in the other of the dataset records according to the relation $$d(v_i, v_j) = \log\frac{N}{Freq(v_i)} * \log\frac{N}{Freq(v_j)}$$

where N represents a number of records in the dataset.

13. The medium of claim 12 where the method further comprises:
- defining a plurality of features of the records in the dataset;
- for each of the features, calculating one of the pairwise distances between the each feature of the current record and a corresponding feature of another of the dataset records;
- combining the distances to produce a total distance between the current record and the other of the dataset records; and
- calculating the score for the current record in response to the total distance.

14. Apparatus for detecting whether a current record in a dataset is an anomalous record, comprising:
- a feature digital preprocessor for defining a feature of the records in the dataset;
- a distance calculator for calculating a plurality of pairwise distances between a value of the feature in the current record and a value of the feature in at least some of the records in the dataset, where each pairwise distance is either:
  - (A) small for mismatches between the values when both values rarely occur in the dataset records or where the distance is large for mismatches between the values when both of the values commonly occur in the dataset records; or
  - (B) large for mismatches between the values when both values rarely occur in the dataset records or where the distance is small when both of the values commonly occur in the dataset records;
- an outlier detector for producing a score for the current record in response to the plurality of distances, and for indicating that the current record is anomalous if the score meets a predetermined criterion;
- wherein the distances are responsive to the frequency Freq $(v_i)$ of the value $v_i$ of the feature in the current record and to the frequency Freq$(v_j)$ of the value $v_j$ of the feature in another of the records in the dataset; and
- each of the pairwise distances d from a value $v_i$ of the feature in the current record and a value $v_j$ of the feature in the other of the dataset records is calculated according to the relation $$d(v_i, v_j) = \log \frac{N}{Freq(v_i)} * \log \frac{N}{Freq(v_j)}$$

where N represents a number of records in the dataset.

15. The apparatus of claim 14 where:
- the feature digital preprocessor is adapted for defining a plurality of features of the records in the dataset;
- the distance calculator is adapted for calculating one of the pairwise distances $d_k$ between the each feature of the current record and a corresponding feature of another of the dataset records for each of the features; and
- the outlier detector is adapted for combining the distances to produce a total distance representing a total distance between the current record and the other of the dataset records, and for calculating the score for the current record in response to the total distance.

16. A system for detecting intrusions in a computer attached to a network, comprising:
- a data-capture module for receiving message records from the network;
- a feature digital preprocessor for defining a feature of the records in the dataset;
- a distance calculator for calculating a plurality of pairwise distances between a value of the feature in the current record and a value of the feature in at least some of the records in the dataset, where each pairwise distance is either:
  - (A) small for mismatches between the values when both values rarely occur in the dataset records or where the distance is large for mismatches between the values when both of the values commonly occur in the dataset records; or
  - (B) large for mismatches between the values when both values rarely occur in the dataset records or where the distance is small when both of the values commonly occur in the dataset records;
- an outlier detector for producing a score for the current record in response to the plurality of distances, and for indicating that the current record is anomalous if the score meets a predetermined criterion;
- wherein the distances are responsive to the frequency Freq $(v_i)$ of the value $v_i$ of the feature in the current record and to the frequency Freq$(v_j)$ of the value $v_j$ of the feature in another of the records in the dataset; and
- each of the pairwise distances d from a value $v_i$ of the feature in the current record and a value $v_j$ of the feature in the other of the dataset records is calculated according to the relation $$d(v_i, v_j) = \log \frac{N}{Freq(v_i)} * \log \frac{N}{Freq(v_j)}$$

where N represents a number of records in the dataset.

17. The system of claim 16 further comprising a filter for removing certain records from the dataset.

18. The system of claim 16 further comprising a known-detector for detecting records having known attacks, and for removing such records from the dataset.

19. The system of claim 18 further comprising a pattern analyzer for summarizing a group of the anomalous records.

20. The system of claim 19 where the pattern analyzer is adapted to develop models for intrusions, and to send the models to the known-detector.

21. The system of claim 16 comprising defining d=0 for $v_i=v$.

* * * * *

UNITED STATES PATENT AND TRADEMARK OFFICE
CERTIFICATE OF CORRECTION

| | | |
|---|---|---|
| PATENT NO. | : 7,668,843 B2 | Page 1 of 1 |
| APPLICATION NO. | : 11/302989 | |
| DATED | : February 23, 2010 | |
| INVENTOR(S) | : Ertoz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 236 days.

Signed and Sealed this

Twenty-eighth Day of December, 2010

David J. Kappos
*Director of the United States Patent and Trademark Office*